United States Patent [19]

Eckels

[11] 4,365,175

[45] Dec. 21, 1982

[54] FAST STARTING COLD SHIELD COOLING CIRCUIT FOR SUPERCONDUCTING GENERATORS

[75] Inventor: Phillip W. Eckels, Penn Hills, Pa.

[73] Assignee: Electric Power Research Institute, Inc., Palo Alto, Calif.

[21] Appl. No.: 191,564

[22] Filed: Sep. 29, 1980

[51] Int. Cl.³ .............................................. H02K 9/00
[52] U.S. Cl. ..................................... 310/53; 310/61; 310/64; 165/104.19
[58] Field of Search .................. 310/10, 52.54, 58, 59, 310/61, 64, 65, 261; 165/104.19, 104.31; 137/812

[56] References Cited

U.S. PATENT DOCUMENTS

| | | | |
|---|---|---|---|
| 3,461,897 | 8/1969 | Kwok | 137/812 |
| 3,517,231 | 6/1970 | Massar | 310/52 |
| 4,085,343 | 4/1978 | Hasegawa | 310/52 |
| 4,217,171 | 8/1980 | Schaffer | 310/10 |
| 4,236,091 | 11/1980 | Kutateladze | 310/261 |
| 4,249,575 | 2/1981 | Syred | 137/812 |

FOREIGN PATENT DOCUMENTS 744155 6/1980 U.S.S.R. ............................. 137/812

OTHER PUBLICATIONS

M. T. Brown, et al.; "Rotor Cooling System for a 10 MVA Superconducting Generator"; MIT Cambridge, Mass.; 1979.

J. A. Schwoerer et al.; "Transient Cooling of a Fault-Worthy Superconducting Electric Generator"; MIT Cambridge, Mass; 1979.

Eckels et al.; "A Helium Cooling System for Large Superconducting A.C. Generators"; ASME, New York, N.Y.; 1978.

*Primary Examiner*—R. Skudy
*Attorney, Agent, or Firm*—William D. Lanyi

[57] ABSTRACT

An apparatus is provided for rapidly restarting the flow of coolant through the cold electromagnetic shield of a superconducting rotor following a thermal transient episode. A vortex diode inhibits coolant flow in the undesirable reverse direction and encourages the reestablishment of a normal thermosyphon cooling loop flow quickly following the termination of a thermal transient such as that caused by transmission line faults. The present invention requires no moving parts and may therefore be permanently sealed in the superconducting rotor without risk of costly repair efforts caused by components failure.

12 Claims, 5 Drawing Figures

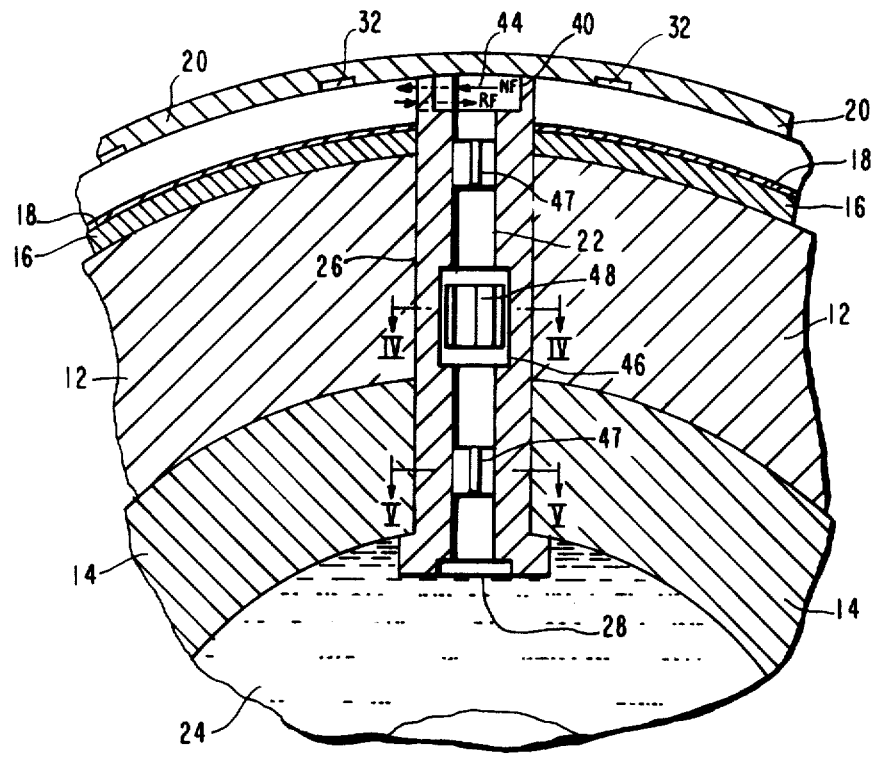
FIG. 3
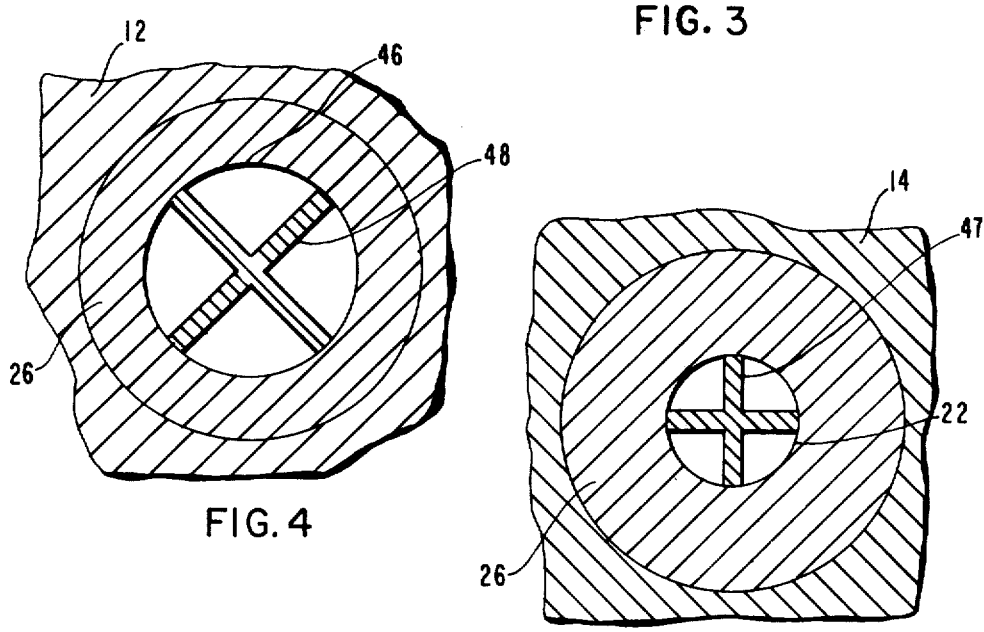
FIG. 4
FIG. 5

FAST STARTING COLD SHIELD COOLING CIRCUIT FOR SUPERCONDUCTING GENERATORS

BACKGROUND OF THE INVENTION

The present invention relates generally to the rotor of a superconducting generator and more specifically to the cooling loop whose function is to provide helium flow in contact with the generator rotor's copper electromagnetic cold shield.

Typically, a superconducting generator utilizes a supercooled rotor which includes a superconducting field winding. A fluid refrigerant, for example liquid helium, is used to supercool the winding to a cryogenic temperature. Replacing the conventional, copper conductor field winding in the rotor of a synchronous generator with a high capacity superconducting winding that has virtually zero resistance at cryogenic temperatures results in some important benefits. The most obvious benefit is the elimination of rotor $I^2R$ loss. Rotor ventilation power requirement reductions accompany the resulting reduction in excitation power. More subtle, but nonetheless beneficial, attributes of the superconducting synchronous generator are the increased power density and the elimination of stator iron in the armature winding.

Also, since the airgap armature winding can be electrically isolated from ground potential, the generator winding can be developed to operate at electrical voltages equal to transmission line voltages, thus eliminating the need for generator step-up transformers. Finally, the stronger magnetic coupling between the rotor and stator of a superconducting generator's magnetic circuits can make a major contribution to electrical system static and dynamic stability performance.

One criterion for stability is that superconducting generators for power plant application must be designed to remain in the superconducting state through the power system's most severe operating condition: the three-phase, high-voltage transmission line fault interrupted by a backup breaker after 15 cycles (250 msec). When a transmission line fault occurs, the rotor's superconducting windings are subjected to heating caused by currents that are induced to flow in the cold shield by time-varying magnetic fields. This heating can readily cause a transition to the resistive state if the windings are not shielded from it. Resistive transitions (quenches) result in a generator outage. In order to be judged fault worthy, the superconducting rotor must be able to withstand these transmission line faults without having its field windings rise above superconducting temperatures and into the resistive state.

Faults in the power system (in the high voltage side of the generator's step-up transformer) cause a sudden increase in the load on the generator resulting in a decrease in its speed of rotation. This is quickly followed by an increase in turbine power output as it attempts to maintain synchronization with the transmission line frequency. Soon afterward (3–6 cycles) circuit breakers open to remove all of the load from the generator, greatly reducing its power consumption. This, coupled with the turbine's attempt to increase its power output, results in an instantaneous overspeed condition. As the turbine continues to attempt to maintain synchronization with the transmission line frequency its speed oscillates about this frequency, first above and then below the speed required for synchronization. This "hunting" creates a time-varying magnetic field which penetrates the superconducting rotor.

On the outside of the rotor is a damping shield, at room temperature, in which currents flow due to these magnetic fields. This heating dissipates energy thereby damping the oscillation of the rotor. This action causes the damping shield to compress and perform work in attempting to distort the magnetic field inside the warm damper. To prevent a subsequent heating of the superconducting rotor windings, a cold shield is placed radially outside of the windings and inside of the damping shield. The function of this copper shield is to remain rigid and allow currents to flow in it that oppose the magnetic field variation generated from the damper shield's motion. The hunting of the generator lasts for a few seconds during which the above-mentioned energy dissipation and resulting current flow exist.

Radially inside of the cold shield and outside of the rotor's field windings is a stainless steel cylindrical field winding retaining tube. The stainless steel cylinder has a very low thermal diffusivity and therefore will act as a heat barrier in delaying the progress of the resulting heat wave from the cold shield radially inward to the rotor windings. However, if the cold shield is not cooled before the heat wave reaches the winding, the winding temperature will rise above superconducting temperatures and a transition to the resistive state will result. The present invention deals directly with this problem and the requirement that an adequate coolant flow exists immediately after the cold shield begins to heat in order that the superconducting generator be fault worthy.

During normal operation of the supercooled rotor the cold shield prevents externally radiated heat from reaching the windings. The heat is removed from the cold shield by a cooling loop which passes a slow flow of coolant from the helium pool radially outward through a passage in a radial heat exchanger and into a circumferential channel from which the coolant then flows axially through multiple axial channels, into another circumferential channel and then radially inward back into the helium pool. The radial heat exchanger maintains the inlet end of this cooling loop at a lower temperature than the outlet end. This temperature difference and its resulting differential coolant densities create a thermosyphon which maintains the slow flow of coolant required to remove the radiant heat from the cold shield during normal operating conditions.

However, during the occurrence of a transmission line fault and the resultant time-varying magnetic fields as described above, the helium in this cooling loop rapidly expands. This expansion would normally cause helium to flow in both directions away from the middle of the loop which is adjacent to the cold shield. Although this two-directional flow lasts for a very short time it would be sufficient to destroy the heretofore steady slow flow of helium through the cooling loop. Following the sudden expansion of helium and destruction of steady coolant flow the helium, if given sufficient time, would again set up a proper cooling loop flow when the temperature differential between the inlet and outlet ends of the loop is reestablished. However, this required time is greater than that afforded by the low thermal diffusivity of the stainless steel field winding retaining tube. By the time that a cooling loop coolant flow is reestablished the rotor's field winding would pass from the superconducting to the resistive state.

To prevent this transition to the resistive state, a means is required for rapidly restarting the thermosyphon in the cooling loop following a thermal transient. This thermosyphon must be restarted within the period of time that it takes for the heat wave to pass through the stainless steel field winding retaining tube and reach the rotor's superconducting field winding.

SUMMARY OF THE INVENTION

The present invention allows for a rapid restart of the cooling loop flow following a transmission line fault and resulting thermal transient. It places a vortex diode at the outlet end of the radial heat exchanger which significantly inhibits coolant flow in the direction toward the radial heat exchanger from the cold shield portion of the cooling loop. The benefits of this vortex diode's operation during and immediately following a transmission line fault are threefold.

First, during the period in which the helium in the cooling loop adjacent to the cold shield is expanding rapidly the vortex diode significantly limits the amount of helium that can flow radially inward through the radial heat exchanger. This has the beneficial effect of causing more helium to flow away from the cold inlet end and toward the warmer outlet end of the cooling loop than would occur if the helium were able to exit the center portion (adjacent to the cold shield) of the cooling loop in both directions. This creates a better cooling effect during the brief period of rapid helium expansion.

Second, since the helium flow during the period of rapid expansion is inhibited from moving toward and through the radial heat exchanger, its predominant flow and therefore the momentum of the helium mass is in the desired direction toward the outlet end and away from the radial heat exchanger. The benefit of this is that, immediately after the rapid expansion of helium is complete, this momentum will tend to continue the helium flow toward the outlet end of the cooling loop and serve to aid the reestablishment of post-fault cooling loop flow in the proper direction.

Third, in the period following the transmission line fault when the helium in the cooling loop has not yet completely reestablished a normal coolant flow, the vortex diode inhibits the helium from flowing in the direction toward the radial heat exchanger and inlet opening while allowing a free flow of helium toward the outlet opening. This encourages a reestablishment of the thermosyphon, reducing the time required to restart normal flow in the cooling loop.

As described below, in the preferred embodiment the vortex diode is machined in the outlet (radially outermost) end of the radial heat exchanger. Radially inward from the vortex diode, in the cooling loop segment that lies within the radial heat exchanger, anti-swirl vanes prevent the helium from flowing through this passage with a spiral motion. Since some reduced flow of helium may pass radially inward through the radial heat exchanger during the period of rapid helium expansion described above, some means must be utilized to minimize the deleterious effect of this flow in the reverse direction. The anti-swirl vanes, or flow straighteners, perform this function by preventing the helium from swirling down the passage through the radial heat exchanger. Swirling would allow the helium to achieve a high angular velocity as it proceeds through the heat exchanger toward the helium pool. If this high angular velocity is not prevented, upon reaching the inward end of the radial heat exchanger the helium would diffuse outwardly and destroy the effective pressure drop that exists along the length of the radial heat exchanger. The vanes lessen this spiralling and minimize the above-described loss of pressure drop. To further dissipate the vorticity of the helium's flow, the passage through the radial heat exchanger is constructed with an expanded portion approximately midway between the vortex diode and the inlet opening. When the helium flow expands into the enlarged section of this passage its vortex lines spread apart and then retighten as the helium proceeds further through the narrower segment prior to exiting the radial heat exchanger's inlet opening. This behavior reduces the fluid's vorticity and further aids in preventing spiralling.

The incorporation of a vortex diode in the cold shield cooling loop solves a problem that otherwise would impede the superconducting generator's ability to operate in a fault worthy manner. This combination allows for the inclusion of a one-way flow inhibiting device within a sealed assembly without the apprehension that a costly future disassembly will be required because of a mechanical failure of the device. Since the vortex diode is a fluidic device with no moving parts, its trouble-free operating life will exceed that of the superconducting generator itself while dependably performing its function.

BRIEF DESCRIPTION OF THE DRAWINGS

The invention will be more fully understood from the following detailed description of the preferred embodiment, read in conjunction with the accompanying drawings, in which:

FIG. 3 is a cross-section view of the radial heat exchange of the present invention illustrating its radial passage from the vortex diode to the coolant reservoir. It also depicts the anti-spiral vanes and enlarged passage segment of the present invention.

FIG. 4 is a cross-section view of FIG. 3.

FIG. 5 is a cross-section view of FIG. 3.

DESCRIPTION OF THE PREFERRED EMBODIMENT

Figure 1:
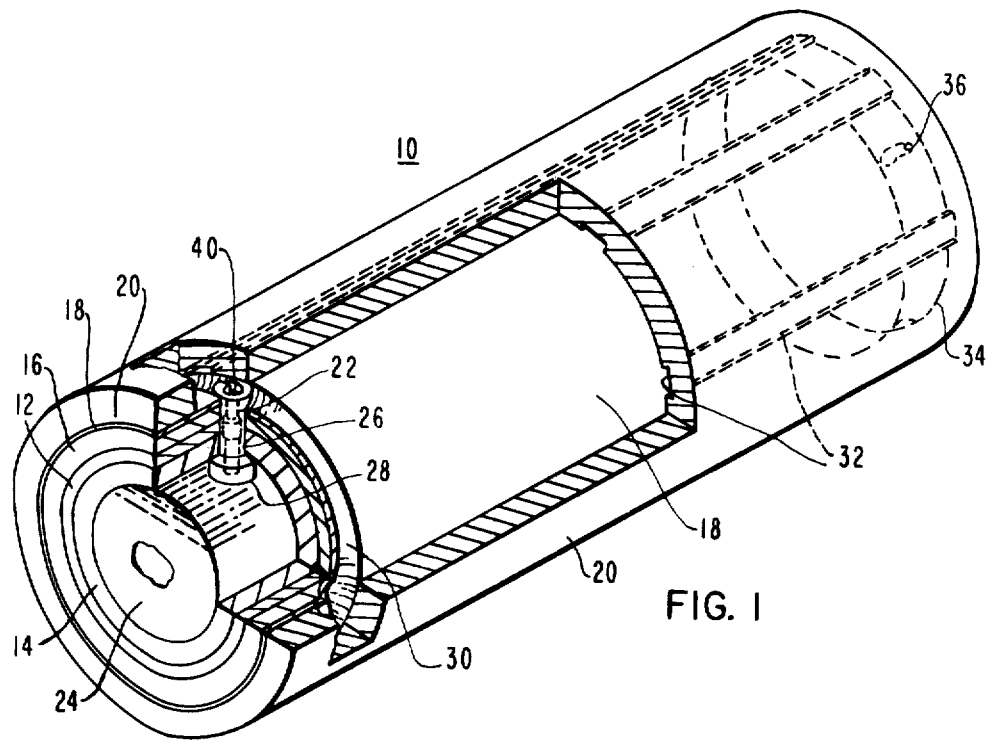
FIG. 1 is an exemplary depiction of the components of a superconducting rotor that are relevant to the present invention.

FIG. 1 is an exemplary depiction of the components of a superconducting rotor relevant to a description of the present invention. The rotor assembly 10 contains a field winding 12 which is disposed about the field winding support 14 section of the main rotor support structure to which all rotating components are attached. Disposed cylindrically about the field winding 12 is the field winding retaining tube 16 which prevents the field winding 12 from moving radially outward under the significant centrifugal forces caused by the high rotational speed (3600 rpm) of the entire rotor assembly 10. Adjacent to the outer surface of the field winding retaining tube 16 is a cold electromagnetic shield 18 which consists of a thin (approximately 0.050" thick) copper sheet whose function is to conduct electrical currents which flow in opposition to the magnetic fluctuating field which exists during transmission line faults. A coolant seal cylinder 20 is cylindrically disposed about the cold shield 18. This coolant seal cylinder's function is to contain the flow of coolant as it forms a cooling loop that removes heat from the cold electromagnetic shield 18 during normal operation, when it shields the field winding 12 from radiant heat, and during the abnormal operating conditions, when the cold shield 18 generates heat during its short-duration current carrying performance while the superconducting generator is subjected to a transmission line fault.

The cold shield cooling loop comprises a radially outward passage 22 that carries coolant from a coolant reservoir 24 in which coolant lies annularly within the field winding support 14 during rotation of the rotor assembly 10. This passage 22 runs radially through a radial heat exchanger 26 from its innermost terminus at the inlet orifice 28 to its outermost terminus which is in fluid communication with a circumferential groove 30 in the outside surface of the field winding retaining tube 16. In the preferred embodiment, the circumferential groove 30 is not continuous, but is divided into a number of segments equal to the number of radial heat exchangers 26 with which it maintains fluid communication. This groove 30 acts as a manifold to distribute coolant to a plurality of axial grooves 32 in the inside surface of the coolant seal cylinder 20. Alternatively, the axial grooves can be located in the winding support cylinder 16, but in the preferred embodiment manufacturing considerations made the choice of placing the grooves in the coolant seal cylinder 20 preferable. The circumferential groove 30 creates fluid communication between the radially outward passage 22 and the axial grooves 32. Toward the outlet terminus of the axial grooves 32, another circumferential groove 34 maintains fluid communication between the axial grooves 32 and a radially inward passage (not shown in FIG. 1) which connects with the circumferential groove 34 at a radial return orifice 36 and extends radially inward toward its outlet terminus adjacent to the coolant reservoir 24.

As detailed above, a completed cooling loop is provided that is capable of directing a coolant flow from the coolant reservoir 24 radially outward through the radial passage 22 in the radial heat exchanger 26, into the first circumferential groove 30, through the axial grooves 32, into another circumferential groove 34, through an orifice 36 and returning the coolant to the coolant reservoir 24 through a radial passage (not shown in FIG. 1). This cooling loop removes heat, obtained either from radiant heat or internally generated by cold shield current flow, from the cold shield primarily by its direction of coolant through the axial grooves 32.

The radial heat exchanger 26 serves an important purpose in maintaining a coolant flow through the cold shield cooling loop. As the coolant travels radially outward through its passage 22 it is compressed, thereby experiencing a temperature rise. The radial heat exchanger 26 transfers this heat from its radially outermost terminus to its radially innermost terminus at its inlet orifice 28 which is adjacent to the coolant reservoir. This heat transfer lowers the temperature of the coolant at the radially outermost terminus of the radial heat exchanger 26, as it reaches the circumferential groove 30, thereby increasing the magnitude of the temperature gradient between grooves 30 and 34. This increased gradient is more conductive to producing a thermosyphon within the cooling loop.

The vortex diode 40 of the present invention is shown in FIG. 1 at the radially outermost terminus of the radial heat exchanger 26. This specific location is not mandatory for the proper functioning of the present invention but was chosen for ease of manufacture. The vortex diode 40 could be located at other suitable positions within the cold shield cooling loop, as long as it is in fluid communication with and serially connected to the other segments of the cold shield cooling loop.

During the thermal transient condition caused by a transmission line fault, an electrical current is conducted through the cold shield 18. This current creates an $I^2R$ heating of the cold shield 18. This heating causes the coolant which is adjacent to the cold shield 18 in the axial grooves 32, between the circumferential grooves 30 and 34, to rapidly expand. The normal tendency of the expanding coolant would be to move axially through the axial grooves 32 in two directions, toward both circumferential grooves 30 and 34, and radially inward through both available radial passages toward the coolant reservoir 24. If this abnormal flow is allowed to occur the normal coolant flow in the cold shield cooling loop would be seriously disturbed and the heat from the cold shield 18 would travel radially inward through the field winding retaining tube 16 to the field winding 12 before a sufficient properly directed cooling loop flow could be reestablished. This phenomenon would heat the field winding 12 above superconducting temperatures and a transition would occur into the resistive state, resulting in a generator outage.

The presence of the vortex diode 40 in the cooling loop prevents this normal tendency and its potentially catastrophic results. During the period of rapid coolant expansion, the vortex diode 40 severely inhibits the coolant from flowing radially inward, toward the coolant reservoir, through the radial heat exchanger 26. This restriction forces the expanding volume of coolant to flow away from the vortex diode 40 and toward the circumferential groove 34 and the outlet orifice end of the cooling loop. This flow pattern is thermodynamically preferable to the two directional flow described above and improves the heat transfer away from the cold shield during the brief period of rapid expansion of the coolant.

Immediately following the rapid expansion episode described above, the coolant mass in the cooling loop has a net momentum in the direction from the circumferential groove 30 to the circumferential groove 34. Since this direction of flow is the same as that utilized during normal operating conditions, this momentum has the beneficial effect of encouraging a reestablishment of a properly-directed thermosyphon following a fault-induced thermal transient.

Also in the period immediately following the episode of rapid coolant expansion, the vortex diode 40 continues to inhibit fluid flow from the circumferential groove 30 into the radial heat exchanger 26. During this period, when the coolant loop flow has not yet stabilized, the coolant is subjected to various forces caused by the rotation of the rotor assembly 10, thermal and pressure gradients, and fluid momentum. The vortex diode 40, by its natural fluidic characteristics, favors those forces that tend to cause a coolant flow in the proper direction and inhibits flow in the undesirable direction, thereby encouraging the reestablishment of a normal thermosyphon flow.

These effects, caused by the vortex diode 40, aid the reestablishment of a proper cooling loop flow before the heat wave can propagate from the cold shield 18 through the field winding retaining tube 16 and into the field winding 12. This accelerated reestablishment is critical since the low thermal diffusivity and thickness of the field winding retaining tube 16, although sufficient to slow the progress of the heat wave, could not delay its progress long enough for the cooling loop to reestablish a proper flow direction in all cases through thermosyphon action alone.

Figure 2:
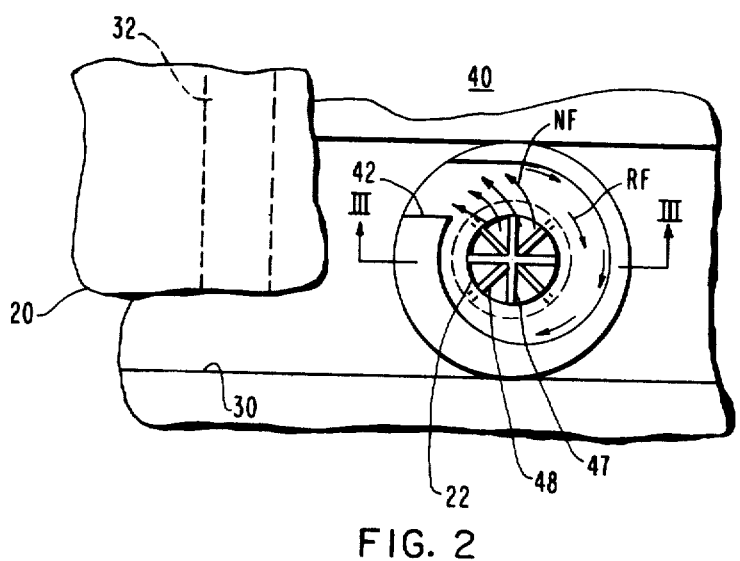
FIG. 2 is a depiction of the vortex diode of the invention.

FIG. 2 shows a view of the vortex diode 40 as it would be seen looking radially inward toward the rotor with the coolant seal cylinder (item 20 in FIG. 1) removed. It comprises an outlet port 42 and a vortex chamber 44. At the center of the vortex chamber 44 is the radially outermost terminus of the radially outward passage 22 described above. Also shown in FIG. 2 are the normal flow streamlines NF and reverse flow streamlines RF. As can readily be seen, the normal flow can proceed directly from the orifice of the radially outward passage 22 to and through the outlet port 42. This flow would then continue into the circumferential groove (item 30 of FIG. 1) and through the cooling loop. The reverse flow streamlines RF, however, illustrate that it must pass in a spiral manner due to the shape of the vortex chamber 44. This vertical flow pattern, due to conservation of momentum, experiences a decrease of its moment of inertia as it progresses toward the center of the vortex chamber. As the fluid speed increases, toward the center of the vortex chamber 44, it is resisted by a centrifugal component of force which inhibits its motion toward the orifice of the radially outward passage 22. This force produces the diode effect of encouraging flow in one direction (the normal flow direction NF) while inhibiting flow in the opposite direction (the reverse flow direction RF).

To aid this characteristic of the vortex diode 40, the radially outward passage (item 22 of FIG. 1) has been altered from a normal single-diameter cylindrical passage. Section III—III of FIG. 2 is shown in FIG. 3. The two modifications of the passage 22 shown in FIG. 3 are both intended to reduce vorticity of flow through the passage 22. As described above, the vortex diode 40 severely inhibits fluid flow in the reverse direction. However, it is not a perfectly efficient fluidic device and some amount of reduced flow may pass through the passage 22 radially inward toward the coolant reservoir 24. If this flow were allowed to proceed vortically through the passage 22 the pressure gradient from the radially outwardmost terminus of the radial heat exchanger 26 to the coolant reservoir would be reduced which would be conductive to the continuation of the reverse flow. This effect is due to the fact that as the swirling fluid would exit the inlet orifice 28 of the radial heat exchanger it would be flung outwardly, rising in velocity and adversely decreasing the pressure gradient along the length of the passage 22. To prevent this deleterious swirling action, two alterations are made in the passage 22.

First, a portion of the passage is enlarged. This segment 46 has a diameter approximately twice the size of the rest of the passage 22. The enlarged segment 46 lies midway between the ends of the passage 22. The fluid's vortex lines expand as it flows into the enlarged segment 46 and again contract as it flows back into the normal sized portion of the passage at its radially inwardmost terminus. This expansion and contraction of vortex lines tends to reduce vorticity and prevent spiralling.

Second, flow-straightening vanes 47 and 48 are disposed in the passage at both the enlarged area (48) and narrow areas (47). These vanes help to maintain a straight, non-vortical flow for the reasons described above. These vanes are further illustrated in FIGS. 4 and 5 which are sections IV—IV and V—V of FIG. 3. Also shown in FIG. 3 are the directions of normal flow NF and reverse flow RF as they would appear in this view.

It should be apparent from the above discussion and drawings to one skilled in the art that the present invention is a novel solution to the problem of unstable coolant flow following a thermal transient in a superconducting rotor and an effective way to speed up the reestablishment of proper coolant flow following a transmission line fault. It should also be apparent that, although the invention was shown and described with certain illustrative embodiments, the present invention is not so limited that other embodiments and modifications are not possible and that although the vortex diode was illustrated and described as being located at the radially outwardmost terminus of the radial heat exchanger other suitable locations in the cooling loop are possible.

What I claim is:

1. A superconducting generator with an improved coolant flow reestablishment characteristic following a thermal transient, comprising:
   a rotor assembly adapted to be supercooled;
   a field winding rigidly attached to the rotor;
   field winding retaining means disposed cylindrically about the field winding;
   means for dissipating energy arising from a magnetic field, said dissipating means disposed cylindrically about the field winding retaining means;
   a fluid coolant;
   coolant sealing means disposed cylindrically about the dissipating means;
   a coolant reservoir located in the center of the rotor assembly;
   means for directing streams of coolant axially along the rotor assembly adjacent to the dissipating means, comprising an axial passage;
   means for directing coolant radially outward from an inlet orifice adjacent the coolant reservoir toward the axial directing means, comprising a radial passage;
   means for directing coolant radially inward from the axial directing means toward an outlet orifice adjacent the coolant reservoir, comprising a radial passage;
   fluidic means for inhibiting coolant flow from the outlet orifice through said combination of directing means toward the inlet orifice; and
   means for maintaining the coolant in the radially outward directing means at a lower temperature than the coolant in the radially inward directing means.

2. The superconducting generator of claim 1, wherein:
   the coolant flow inhibiting means is a vortex diode.

3. The superconducting generator of claim 2, further comprising:
   means for inhibiting vortical coolant flow in the radially outward directing means.

4. The superconducting generator of claim 3, wherein:

said vortical inhibiting means comprises flow straightening vanes aligned axially within the radial passage of the radially outward directing means.

5. The superconducting generator of claim 3, wherein:
said vortical inhibiting means comprises an enlarged diameter segment in the passage of the radially outward directing means on the inlet side of the vortex diode and between two smaller diameter segments of said passage.

6. The superconducting generator of claim 1, wherein:
the means for maintaining the coolant in the radially outward directing means at a lower temperature than the coolant in the radially inward directing means comprises a radial heat exchanger circumferentially disposed about the passage of the radially outward directing means and whose inward end is adjacent to the coolant reservoir.

7. The superconducting generator of claim 1, whereby:
the temperature differential between the coolant in the radially outward directing means and the coolant in the radially inward directing means creates a thermosyphon under normal operating conditions that causes coolant to flow from the coolant reservoir through the radially outward directing means, through the axial directing means, through the radially inward directing means, and then back to the coolant reservoir, creating a cooling loop that flows coolant adjacent to the dissipating means.

8. A method of cooling a cylindrical member of a superconducting rotor, said method comprising:
providing a coolant reservoir located radially inward from said cylindrical member;
partially filling said reservoir with a fluid coolant;
directing the coolant radially outward through a radial passage from the reservoir toward the cylindrical member;
directing the coolant axially along the rotor through an axial passage adjacent to the cylindrical member;
directing the coolant radially inward through a radial passage from the cylindrical member to the coolant reservoir;
maintaining fluid communication between the radially outermost terminus of the radially outward passage and the inlet terminus of the axial passage;
maintaining fluid communication between the radially outermost terminus of the radially inward passage and an outlet terminus of the axial passage;
removing heat from the coolant within the radially outward passage; and
fluidically inhibiting the coolant from flowing through the radially outward passage in a radially inward direction.

9. The method of claim 8, further comprising:
preventing vortical flow within the radially outward passage.

10. The method of claim 8, wherein:
said inhibiting the coolant from flowing inwardly through the radially outward passage is accomplished by the use of a vortex diode.

11. A dynamoelectric machine, comprising:
a rotor having a field winding cooled by a fluid coolant;
a cooling loop disposed within said rotor and including a plurality of channels arranged to provide fluid communication between a first region and a second region of said rotor, said cooling loop enabling a coolant flow between said first and second regions; and
fluidic means, disposed in fluid communication with said cooling loop, for preventing coolant flow in a direction opposite a single preselected direction.

12. The dynamoelectric machine of claim 11, wherein:
said fluidic preventing means is a vortex diode.

* * * * *